A. CHASE.
COMBINED VEGETABLE PARER AND CORER.
APPLICATION FILED OCT. 6, 1909.
948,573.
Patented Feb. 8, 1910.
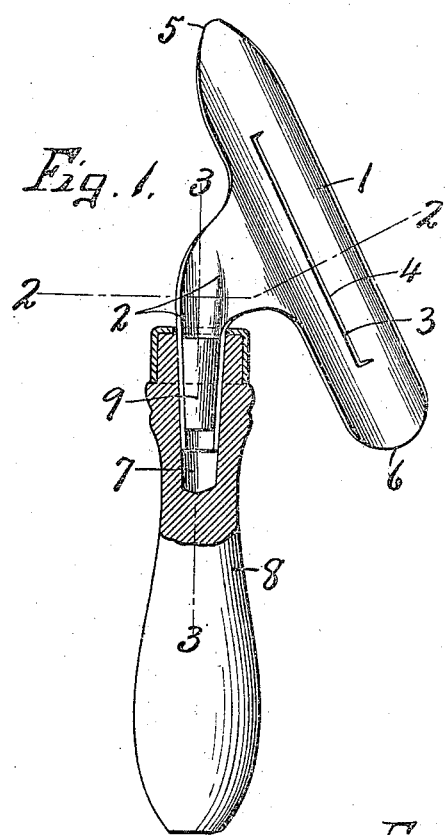
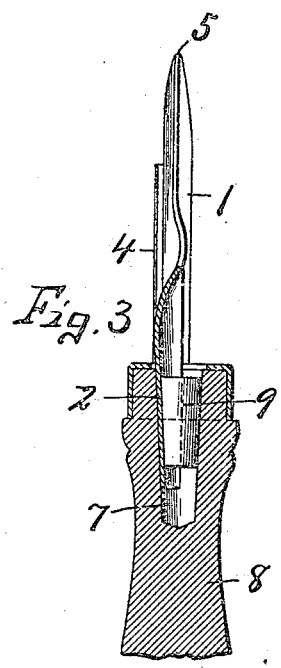
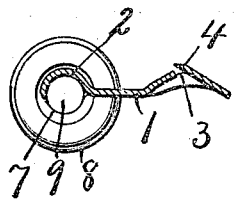
Witnesses.
A. C. Thomas
H. E. Chase
Inventor.
Abner Chase
By.
Howard P. Denison
Attorney.

UNITED STATES PATENT OFFICE.

ABNER CHASE, OF SYRACUSE, NEW YORK.

COMBINED VEGETABLE PARER AND CORER.

948,573.      Specification of Letters Patent.      Patented Feb. 8, 1910.

Application filed October 6, 1909. Serial No. 521,278.

*To all whom it may concern:*

Be it known that I, ABNER CHASE, of Syracuse, in the county of Onondaga, in the State of New York, have invented new and useful Improvements in Combined Vegetable Parers and Corers, of which the following, taken in connection with the accompanying drawings, is a full, clear, and exact description.

This invention relates to certain improvements in combination paring and coring devices for fruit and vegetables and refers more particularly to the hand-operated type, in which the cutting blade is provided with an offset shank adjusted to a suitable handle, the blade and shank being formed of a single piece of sheet metal. In this particular device the shank is concavo-convex in cross section and tapered longitudinally and inserted into a suitable socket in the handle.

My object is to provide a simple means consisting of a conical wedge inserted in the tapering concave side of the shank and socket for retaining the cutter in the handle and at the same time reinforcing the shank against buckling or breaking at its junction with said handle.

Other objects and uses will be brought out in the following description:

In the drawings: Figure 1 is an elevation partly in section of my improved coring and paring device. Figs. 2 and 3 are section views taken respectively on lines 2—2, 3—3, Fig. 1.

This cutter comprises an elongated blade —1— and a shank —2— both formed of a single piece of sheet metal, as sheet steel, and disposed at an angle with each other. The blade —1— is concavo-convex in cross section and provided near its longitudinal center with a lengthwise slit —3—, the portion of the blade at the outer side of the slit being pressed or forced laterally beyond the convex side of the remaining portion of the blade and sharpened to a beveled edge forming a knife or cutter —4—. The outer end of the blade —1— farthest from the handle is somewhat pointed or tapered but sharpened thereby forming a coring point —5—. The opposite end of the blade is somewhat rounded but is also sharpened forming a gouging edge —6— which may be used for cutting out portions of potatoes and other vegetables when necessary.

The shank —2— is offset laterally from the central portion of one side of the blade —1— and is tapered longitudinally and concavo-convex in cross section forming a semi-cylindrical shank. This shank is inserted in a similarly tapered bore or socket —7— in one end of a handle —8—, as best seen in Figs. 1 and 3, the convex side of the shank fitting snugly against the corresponding side of the socket.

A tapering conical plug —9— is driven longitudinally into the concave side of the shank —2— and adjacent portion of the socket —7—, so as to tightly wedge and hold the shank in the handle. This plug is preferably made of wood and while its main purpose is to hold the shank in the handle, it also operates as a reinforcement to strengthen this portion of the shank and permit the entire blade and shank to be made of comparatively thin sheet metal.

What I claim is:

A combined coring and paring device comprising a blade and shank both made of a single piece of sheetmetal, the blade and shank both being concavo-convex in cross section said blade having its central portion provided with a lengthwise slit terminating short of its ends and one side of the slit being pressed outwardly beyond the convex face of the remaining portion of the blade, the shank being offset from the central portion of one side of the blade and tapered longitudinally, a handle having a socket in which the tapered portion of the shank is inserted, and a tapering plug driven into the concave side of the shank and adjacent portion of the socket of the handle.

In witness whereof I have hereunto set my hand on this 1st day of October, 1909.

ABNER CHASE.

Witnesses:
    H. E. CHASE,
    H. L. HUMPHREY.